Sept. 6, 1966   HISAHARU KURACHI   3,271,053
MEANS FOR COUPLING A HOSE TO A PIPE
Filed July 2, 1964
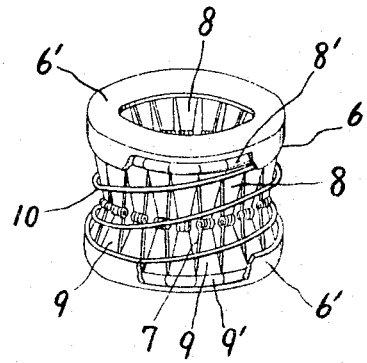
FIG. 3
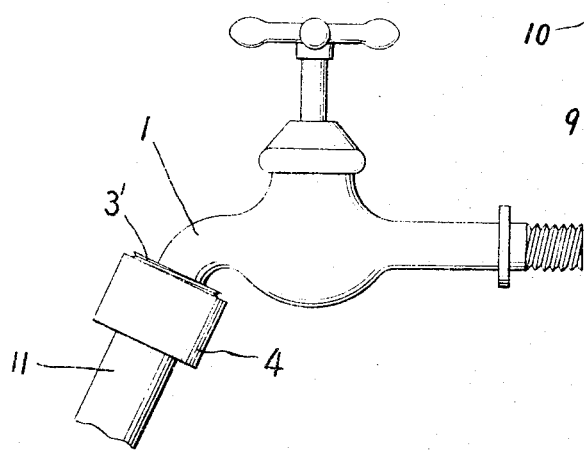
FIG. 1
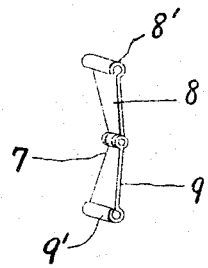
FIG. 4
FIG. 2
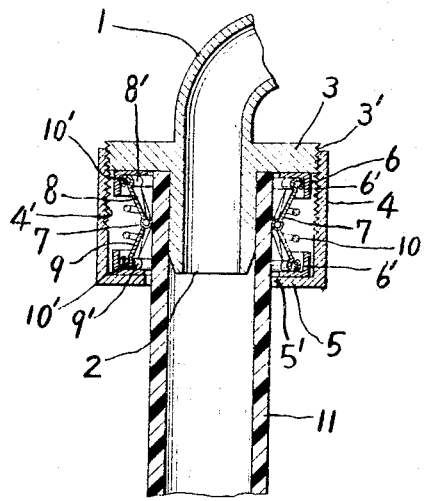
INVENTOR
HISAHARU KURACHI
BY Paul M. Craig, Jr.
ATTORNEY United States Patent Office 3,271,053
Patented Sept. 6, 1966

3,271,053
MEANS FOR COUPLING A HOSE TO A PIPE
Hisaharu Kurachi, 1-13 Suehirochi, Naka-ku,
Nagoya, Japan
Filed July 2, 1964, Ser. No. 379,884
5 Claims. (Cl. 285—8)

The present invention relates to novel means for detachably coupling a hose of rubber, synthetic resin or like material to a supply pipe of various fluids such as gases and liquids.

Heretofore, various means for coupling a hose to a pipe have been proposed, but most of these coupling means have been unreliable due to lack of uniform and positive fastening of the hose on the pipe and in case of a poisonous gas, unexpected disengagement of the hose from the pipe has often induced a mishap. Moreover, frequent coupling and uncoupling of the hose has caused a loss of positive coupling action by the coupling means resulting in leakage of fluid or caused a severe injury on the hose.

Therefore, the primary object of the present invention is to provide novel means for detachably coupling a hose to a pipe, which, in spite of simple structure, insures positive fastening of the hose on the pipe in fluid-tight relation therebetween.

According to the present invention, there is provided a means for coupling a hose to a pipe comprising a flange means provided adjacent an outlet of said pipe, a cup member engaging said flange by means of threads and having an opening in the bottom wall thereof to receive said hose therein, and a spring means disposed between said flange means and said bottom wall of the cup member and adapted to function so as to vary the inside diameter thereof by the movement of said cup member.

The present invention also provides a coupling means of above character, in which said spring means comprises a pair of supporting rings, a plurality of hinged members and a helical spring disposed between said supporting rings, opposite ends of each of said hinged members being hooked on the opposite end turns of said helical spring so that said hinged members may form a drumlike cylindrical body.

There are other objects and particularities of the invention which will become obvious from the following description with reference to the accompanying drawings, in which:

FIG. 1 is a front view of a preferred embodiment of a coupling means of the invention as adapted to couple a hose to the outlet of a cock;

FIG. 2 is a vertical sectional view of the coupling means at the operative position as shown in FIG. 1;

FIG. 3 is a perspective view, partly broken away, of a drumlike cylindrical body incorporated in the coupling means; and FIG. 4 is a perspective view of a hinged member forming a part of the drumlike cylindrical body shown in FIG. 3.

The invention will now be described with reference to the drawings showing a preferred embodiment of the invention. According to the invention, the end edge of an outlet 1 of a pipe, or an outlet of a conventional cock as shown in FIG. 1, is suitably chamfered as at 2 as shown in FIG. 2 and a flange 3 is formed integrally with the outlet 1 at a position adjacent the chamfered end 2. The flange 3 is externally threaded as at 3', and a cup member 4 internally threaded at its upper inside wall is in screw threaded engagement with the threads 3' of the flange 3. The cup member 4 has a bottom wall 5 centrally of which an opening 5' is provided.

Reference numeral 6 designates a spring means or a drumlike cylindrical body which has a shape as shown in FIG. 3. The drumlike cylindrical body 6 comprises an upper supporting ring 6' and a lower supporting ring 6' between which a helical spring 10 is disposed. Along the inner circumference of the helical spring 10, there are vertically and continuously disposed a plurality of hinged members 7, each of which consists of an upper element 8 and a lower element 9 hingedly connected with each other. Respective free ends of the upper and lower elements 8 and 9 of each hinged member 7 are formed with hooks 8' and 9', as shown in FIG. 4, which are hooked on annular coil seats or end turns 10' on opposite ends of the helical spring 10. Further, the upper element 8 and the lower element 9 of each hinged member 7 are gradually narrowed in their width from the respective hooded ends 8' and 9' towards the hinged connection as shown in FIG. 4 so that the circularly juxtaposed hinged members 7 may not abut with one another when the hinged members 7 are bent radially inwardly of the drumlike cylindrical body 6 by a compressive force applied to the latter. The drumlike cylindrical body 6 with such structure is disposed in the cup member 4 and supported on the bottom wall 5 of the cup member 4.

In operation, the cup member 4 having the drumlike cylindrical body 6 therein is slightly screwed onto the threads 3' of the flange 3. Then, a hose 11 is inserted into the drumlike cylindrical body 6 through the bottom opening 5' of the cup member 4 and fitted on the end of the outlet 1. Needless to say that, in this case, the hose 11 is interposed between the end portion of the outlet 1 and the circularly disposed hinged members 7, but it will be understood that the hose 11 can extremely easily be fitted on the end portion of the outlet 1 since the hinged members 7 are only slightly bent radially inwardly of the drumlike body 6 so that the hinged connections do not abut or only slightly abut the hose 11. When, subsequently, the cup member 4 is turned by hand to be advanced upwardly for further threaded engagement with the threads 3' of the flange 3, the drumlike cylindrical body 6 is compressed between the flange 3 and the bottom wall 5 of the cup member 4. The more the drumlike cylindrical body 6 is compressed, the more the hinged members 7 are bent radially inwardly to apply uniform pressure to the entire outer periphery of the hose 11 to thereby fasten the hose 11 onto the outlet 1. By this uniform pressure, the hose 11 can firmly be fixed in place.

In uncoupling the hose 11 from the pipe outlet 1, the cup member 4 may merely be slightly unscrewed on the flange 3 to relieve the compressive force exerted on the drumlike cylindrical body 6, which thereby extends to relieve the fastening pressure applied to the hose 11 by the hinged members 7. The hose 11 can now easily be pulled out of the outlet 1.

From the foregoing description, it will be understood that a hose can easily be coupled to and uncoupled from a pipe outlet by merely slightly advancing and retracting the cup member 4 on the flange 3. A prominent effect of the invention resides in that uniform pressure is concentrically applied to the entire circumference of the hose at the points of contact of the hinged connections of the hinged members 7 and thus there is utterly no possibility of causing unexpected disengagement of the hose or leakage of fluid through the coupling means even with a fluid at high pressure. Another remarkable effect is that the drumlike cylindrical body 6 having the hinged members 7 sensitively making such a resilient action endures a repeated use and is quite free from any faulty operation, which minimizes a possibility of any injury on the hose 11. Further, ease of disassembling of the drumlike cylindrical body 6 provides an additional advantage of ease of repair and subsequent adjustment when damaged.

What is claimed is:

1. A means for coupling a hose to a pipe comprising a flange means provided adjacent an outlet of said pipe, a cup member engaging said flange means by means of threads and having an opening in the bottom wall thereof to receive said hose therein, and a spring means disposed between said flange means and said bottom wall of the cup member and adapted to function so as to vary the inside diameter thereof by the movement of said cup member, said spring means comprising a pair of supporting rings, a plurality of hinged members pivotal intermediate the ends thereof and a helical spring disposed between said supporting rings, opposite ends of each of said hinged members being hooked on the opposite end turns of said helical spring so that said hinged members may form a drumlike cylindrical body.

2. A means for coupling a hose to a pipe provided with flange means adjacent an outlet of the pipe, a cup member threadably engaging said flange means and provided with an opening in the bottom wall thereof to receive therein the hose, and means in the space between said hose and said cup member for securely clamping said hose onto said pipe including a plurality of individual members adapted to fold intermediate the ends thereof, and helical spring means operatively connected with said individual members for normally seeking to extend said members while simultaneously therewith supporting the same in the assembled position in which said hinged members form a drum-like cylindrical body, with the ends of said members being hingedly supported on opposite end turns of said helical spring means.

3. The combination according to claim 2, wherein said individual members are each formed of two parts hingedly connected together.

4. The combination according to claim 3, wherein the hingedly connected parts of each individual member taper in the direction toward the hinged interconnection of the respective two parts.

5. The combination according to claim 2, wherein said individual members taper from the ends thereof toward the center region in such a manner that the ends are wider than the center region.

References Cited by the Examiner

UNITED STATES PATENTS

| 1,083,894 | 1/1914 | Griffith | 285—322 X |
| 2,698,191 | 12/1954 | Samiran | 285—248 |

FOREIGN PATENTS

| 430,356 | 6/1935 | Great Britain. |

CARL W. TOMLIN, *Primary Examiner.*

T. F. CALLAGHAN, *Assistant Examiner.*